ELECTRONIC DIVIDER AND MULTIPLIER USING PHOTOCELLS
Filed Sept. 3, 1965
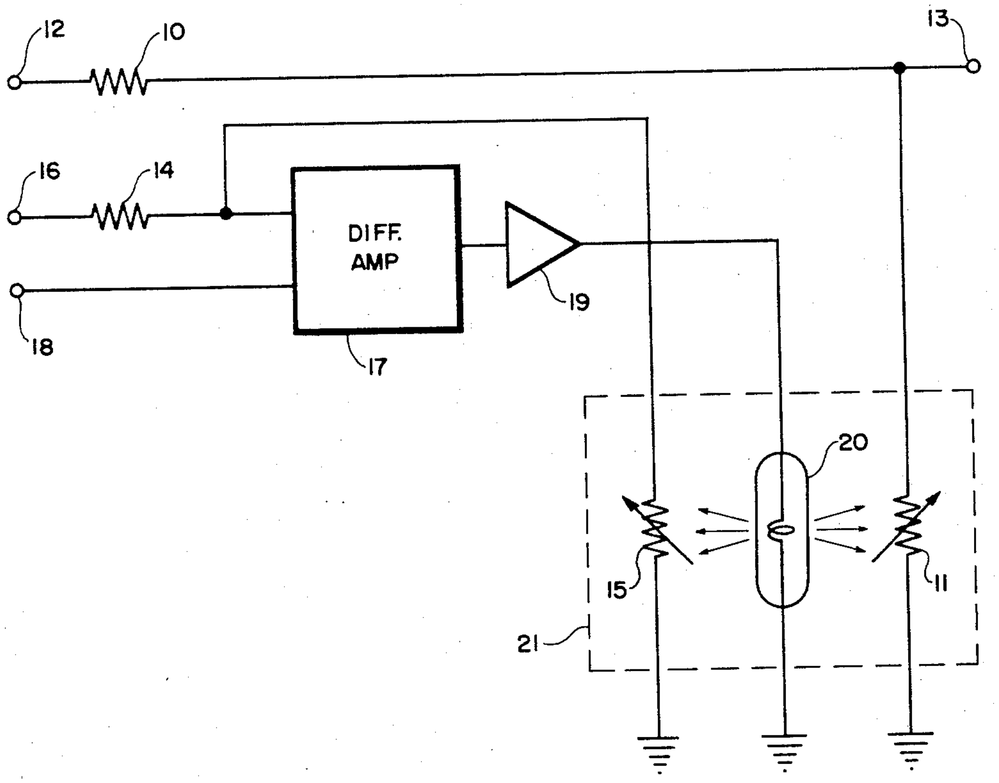
ANTHONY DEL DUCA
*INVENTOR.*
BY A. M. Fernandez
ATTORNEY United States Patent Office 3,423,579

Patented Jan. 21, 1969

3,423,579

ELECTRONIC DIVIDER AND MULTIPLIER USING PHOTOCELLS

Anthony del Duca, Garden Grove, Calif., assignor, by mesne assignments, to the United States of America as represented by the Administrator of the National Aeronautics and Space Administration Filed Sept. 3, 1965, Ser. No. 484,855

U.S. Cl. 235—194 6 Claims

Int. Cl. G06g 7/16

The invention described herein was made in the performance of work under a NASA contract and is subject to the provisions of Section 305 of the National Aeronautics and Space Act of 1958, Public Law 85–568 (72 Stat. 435, 42 U.S.C. 2457).

This invention relates to analog computing apparatus and more particularly to an improved electronic divider and multiplier.

This improved dividing and multiplying apparatus comprises a pair of voltage dividing networks. One voltage dividing network is employed to produce an output signal that is proportional to a first input signal $e_1$ applied thereto divided by a second input signal $e_2$ applied to the second voltage dividing network and multiplied by a third input signal $e_3$ applied to a means for producing the difference $\epsilon$ between the third input signal $e_3$ and a signal proportional to the second input signal $e_2$ derived from the second voltage dividing network. Each voltage dividing network comprises a photoconductive device in series with a resistor.

A light emitting device, which emits light in proportion to an electrical signal applied thereto, is connected to the output of the differential means and optically coupled to both photoconductive devices. If the difference $\epsilon$ increases, the light intensity received by the photoconductive devices increases. Since both photoconductive devices are equally coupled to the light emitting device, the one voltage dividing network provides an output signal $e_0$ that is proportional to an input signal $e_1$ applied thereto, divided by a second input signal $e_2$ applied to the other voltage dividing network, and multiplied by the third input signal $e_3$ which is applied directly to the differential means.

In such an improved analog computing apparatus, any of the input signals $e_1$, $e_2$ and $e_3$ may be a constant or reference to obtain simply a ratio of two signals or simply the product of two signals.

An object of this invention is the provision of an improved apparatus for multiplying and dividing analog electrical signals in an arrangement for such computations at a cost lower than other arrangements which are presently in use such as potentiometers driven by servo motors; relay switches and fixed resistors to establish conductances proportional to multipliers and dividers; and expensive operational amplifiers and associated interconnecting networks.

The invention, both as to its organization and operation may be understood by reference to the following description taken in conjunction with the accompanying drawing in which an electronic divider-multiplier constructed in accordance with the teachings of the present invention is shown.

Referring to the drawing, the electronic divider-multiplier circuit comprises two voltage dividing networks. The first consists of a resistor 10 and a photoconductive device 11 connected in series between an input terminal 12 and a source of reference potential. The second voltage dividing network consists of a coupling resistor 14 and second photoconductive device 15 connected in series between an input terminal 16 and a source of reference potential. Although ground is here employed as the source of reference potential for both photoconductive devices 11 and 15, it should be understood that each may be connected to an independent source of reference potential. First and second input signals $e_1$ and $e_2$ are connected to the input terminals 12 and 16.

The junction between the resistor 14 and the photoconductive device 15 is connected to an input terminal of a differential amplifier 17. A third input signal is applied to the other input terminal 18 of the differential amplifier to provide an error or difference signal $\epsilon$ to a high-gain amplifier 19 which energizes a light-emitting device 20 such as an electroluminescent cell or incandescent lamp.

The light emitting device 20 is optically coupled to the two photoconductive cells 11 and 15. The two photoconductive devices have substantially identical electrical characteristics and are both placed in the same housing 21, preferably made of opaque material in order that they may both be exposed to the same light from the device 20. However, it can be shown that similar results are obtained if the resistance of the photoconductive cell 11 is equal to the resistance of the photoconductive cell 15 times some constant, rather than equal to the resistance of the photoconductive cell 15, provided the resistor 10 in series with the photoconductive cell 11 is equal to the resistance R of the coupling resistor 14 times the same constant. This circuit is capable of performing both multiplication and division with a time constant of a few milliseconds which is determined primarily by the response of the feedback path comprising the light emittin device 20 and the photoconductive device 15.

In one specific embodiment which has been built and successfully tested, a cadmium selenide photoconductive cell was selected having a rise time of less than four milliseconds and decay time of less than three milliseconds with an average resistance of 50K ohms. The coupling resistors 10 and 14 were then selected to have approximately the same impedance, or 51K ohms. In order that the photoconductive devices have substantially identical electrical characteristics, dual element photoconductive cells were selected since, in the fabrication of a dual element photoconductive cell, the separate photoconductive elements are produced, as by vapor deposition techniques, on the same substrate at the same time and placed in the same cell package. In that manner, the operating characteristics of both photoconductive devices will be as close to the same as possible.

With an amplifier 19 of sufficiently high gain, the feedback provided by the connection of the junction between the resistor 14 and the photoconductive device 15 to one input terminal of the differential amplifier will be in accordance with the following equation:

$$\frac{e_2 \cdot r_1}{R+r_1}=e_3 \qquad (1)$$

where the voltage signal $e_3$ is an input voltage applied to the input terminal 18 R represents the value of resistance 14, and $e_2$ represents an input signal applied to the input terminal 16. The foregoing equation holds because the value of the photoconductive device 15 which is equal to $r_1$ is controlled by the light intensity from the light emitting device 20 which, in turn, is controlled by the output signal $\epsilon$ from the differential amplifier 17. Thus with the high gain amplifier 19 energizing the light emitting device 20, feedback through the optical coupling to the photoconductive device 15 maintains the difference signal $\epsilon$ from the differential amplifier 17 at substantially zero volts to maintain the equality of Equation 1. In other words, if the difference between the input voltage $e_3$ and the voltage signal at the junction between the resistor 14 and photoconductive device 15 is equal to zero, the input voltage $e_3$ must be equal to the input signal $e_2$ times $$\frac{r_1}{R+r_1}$$

The resistance value $r_1$ of the photoconductive device 15 can be derived from Equation 1 as follows:

$$r_1=\frac{e_3R}{e_2-e_3} \quad (2)$$

It should be noted that the resistance $r_2$ of the photoconductive device 11 is at all times equal to the resistance $r_1$ of the photoconductive device 15.

Referring now to the first voltage dividing network, it may be seen that an equation can be written for the output signal $e_0$ at the output terminal 13 in terms of the resistance of the coupling resistor 10, the resistance R of the coupling resistor 10 and the resistance $r_2$ of the photoconductive device 11 as follows:

$$e_0=\frac{e_1r_2}{R+r_2} \quad (3)$$

Since as just noted, the resistance $r_1$ of the photoconductive device 15 is the same as the resistance $r_2$ of the photoconductive device 11 because both are in the same housing exposed to the same light intensity from the light emitting device 20, the value of the resistance $r_1$ obtained from Equation 2 may be substituted for the value $r_2$ in Equation 3 to obtain the value of the output signal $e_0$ as a function of the input singals $e_1$ at the input terminal 12, $e_2$ at the input terminal 16 and $e_3$ at the input terminal 18 as follows:

$$e_0=\frac{e_1}{e_2}e_3 \quad (4)$$

Thus the electronic multiplier-divider circuit shown provides an output voltage that is proportional to a first input signal divided by a second input signal and multiplied by a third signal any one of which may be a constant rather than a variable. For instance, if the third input signal $e_3$ is a variable rather than a constant, and the input signal $e_2$ at the input terminal 16 is a constant reference voltage, the circuit arrangement will provide an output signal $e_0$ that is proportional to an input signal $e_1$ multiplied by a second input signal $e_3$ according to the following equation:

$$e_0=K_1e_1e_3 \quad (5)$$

where the constant $K_1$ is equal to the absolute value of $1/e_2$. But if the input signal $e_3$ is a constant $K_2$, and the input signal $e_2$ is a variable, the output signal $e_0$ is proportional to the ratio of the input signals according to the following equation:

$$e_0=K_2\frac{e_1}{e_2} \quad (6)$$

In a preferred embodimeint, the differential amplifier comprises a pair of transistors, preferably of the field-effect type, connected in the usual manner of difference amplifiers in general as described by Millman and Taub at page 20 of Pulse and Digital Circuits published by McGraw-Hill Book Company (1956). However, it should be understood that any circuit for obtaining the difference between two signals may be employed. The high gain amplifier 19 may consist of two transistor amplifier stages connected in cascade followed by a third stage with the light emitting device 20 in the emitter circuit. The light emitting device 20 is preferably of the incandescent type comprising a coiled tungsten filament operating at about 3 volts.

While the principles of the invention have now been made clear in illustrative embodiments, there will be immediately obvious to those skilled in the art many modifications in structure, arrangement, proportions, the elements, materials, and components, used in the practice of the invention, and otherwise, which are particularly adapted for specific environments and operating requirements, without departing from those principles. The appended claims are therefore intended to cover and embrace any such modifications, within the limits only of the true spirit and scope of the invention.

What I claim is:

1. In combination:

a light emitting device which emits light in proportion to an electrical signal applied thereto, first and second photoconductive devices optically coupled to said light emitting device, each of said photoconductive devices having a conductance between two terminals which is proportional to the intensity of light coupled thereto from said light emitting device, and each having a first one of its two terminals connected to a source of reference potential, first and second input terminals adapted to be connected to respective first and second signal sources, a first resistor coupling said first input terminal to a second terminal of said first photoconductive device, a second resistor coupling said second input terminal to a second terminal of said second photoconductive device, means for producing the difference between two electrical signals, said means having two input terminals and one output terminal, a first one of said latter input terminals being connected to a junction between said first photoconductive device and said first resistor, a second one of said latter input terminals being adapted to be connected to a third signal source, and said output terminal being coupled to said light emitting device to apply an electrical signal thereto, and an output terminal connected to a junction between said second photoconductive device and said second resistor.

2. The combination as defined in claim 1 wherein the conductance characteristics of said first and second photoconductive devices are substantially equal.

3. The combination as defined in claim 2 wherein each of said first and second photoconductive devices has one of its two terminals connected to a common source of reference potential.

4. The combination as defined in claim 1 wherein said output terminal is coupled to said light emitting device by a high gain amplifier.

5. The combination as defined in claim 4 wherein the conductance characteristics of said first and second photoconductive devices are substantially equal.

6. The combination as defined in claim 5 wherein each of said first and second photoconductive devices has one of its two terminals connected to a common source of reference potential.

References Cited

UNITED STATES PATENTS 3,193,672 7/1965 Azgapetian ---------- 235—194
3,215,824 11/1965 Alexander et al. ------- 235—194

MALCOLM A. MORRISON, *Primary Examiner.*

JOSEPH F. RUGGIERO, *Assistant Examiner.*

U.S. Cl. X.R.

235—195; 250—205